United States Patent [19]
Fuller

[11] 4,204,640
[45] May 27, 1980

[54] DOCUMENT HANDLING APPARATUS
[75] Inventor: Paul Fuller, Romford, England
[73] Assignee: Vickers Limited, London, England
[21] Appl. No.: 969,089
[22] Filed: Dec. 31, 1978
[30] Foreign Application Priority Data
Dec. 16, 1977 [GB] United Kingdom ............... 52554/77
[51] Int. Cl.² ...................... G06K 13/02; G06K 19/06
[52] U.S. Cl. ..................................... 235/476; 235/494
[58] Field of Search ............... 235/424, 425, 427, 476, 235/419, 474, 475; 53/266 A

[56] References Cited
U.S. PATENT DOCUMENTS

| | | | |
|---|---|---|---|
| 2,989,181 | 6/1961 | Dickinson | 235/425 |
| 3,641,319 | 2/1972 | McGuire | 235/487 |
| 3,891,492 | 6/1975 | Watson | 235/487 |
| 4,091,268 | 5/1978 | Jarleton et al. | 235/424 |

Primary Examiner—Daryl W. Cook
Attorney, Agent, or Firm—Shoemaker and Mattare, Ltd.

[57] ABSTRACT

Cost saving and improved reliability are achieved in document handling apparatus controlled by code markings on the documents. By using only as many reading heads as there are channels containing code markings one after another in a predetermined feeding direction of the document through the machine, to generate pulses corresponding to the markings, simplified digital control circuitry, including shift registers, can be used to control the operation of document handling stations synchronously with the arrival times of the document at the stations.

9 Claims, 11 Drawing Figures

RONEO-VICKERS LIMITED
VAT REG. NO.

INVOICE

\*\*\*\* \*\* \*\*
TO:-
RONEO-VICKERS LTD.
ROMFORD
ESSEX

DOCUMENT HANDLING APPARATUS

FIELD OF THE INVENTION

The present invention relates to document handling apparatus.

DESCRIPTION OF PRIOR ART

Document inserting machines, for example, for automatically inserting documents into envelopes, are well known. Examples of such machines are to be found in the ERTMA range offered by Ronco Neopost Limited.

In such a document inserting machine a series of master, or initiating, documents are fed in succession through a number of machine stations at which a variety of document handling operations can be carried out. For example, there may be a guillotining station, for cutting the master documents, a folding station, and one or more feeding stations which are each operable to feed in supplementary documents for assembly with master documents so that each master document is inserted into an envelope together with a selection of supplementary documents. The master documents might be invoices and the supplementary documents advertising or promotional literature.

Each master document in a series can be assembled together with a different selection of available supplementary documents.

Control of the various machine stations so that correct relative timing of their operation is provided, and so that each master document is subjected to appropriate handling operations, has been carried out in dependence upon control code markings carried by each successive master document.

These code markings have been positioned horizontally across a master document, that is, in the direction of the lines of printed characters on the document, which is transverse to the direction of master document feed.

As a master document is fed through such a previously proposed machine the code markings are read and control codes are generated in dependence upon the presence or absence of markings at each of a number of predetermined code marking locations along a horizontal line across the master document. The presence or absence of a code marking at a code marking location is detected by a reading head provided in respect of that location, so that the code marking locations along the horizontal line are read in parallel by respective reading heads. The code markings may be present on only one line of each master document, which means that the reading heads and their associated amplifiers and processing electronics are used, in such a previously proposed machine, only for a small fraction of the total time available.

SUMMARY OF THE INVENTION

According to the present invention there is provided document handling apparatus, including document feed means operable to feed a predetermined form of document, bearing selectively provided serial code markings located one after another in a predetermined feeding direction on the document, in the said feeding direction, so that the code markings are read in sequence by a reading head of the apparatus and the document is fed in succession through at least two document-handling stations of the apparatus, at which stations the apparatus can subject the document to respective predetermined handling operations, and synchronisation pulse generation means operable to generate synchronisation pulses for establishing reference timings for the reading of the code markings in dependence upon movement of the document in the feeding direction, and further including code responsive control circuitry connected between the reading head and the document handling stations and operable in response to the serial pattern of the code markings as read by the reading head at the said reference timings, to control whether or not the document is subject to one or each of the said respective predetermined handling operations at the two stations.

The said serial pattern of code markings can simply be provided by the pattern of presence and absence of a predetermined form of visible printed mark on the document at successive reading locations which the reading head examines at successive reference timings in dependence upon the movement of the document in the feeding direction.

In preferred embodiments of the present invention, the said predetermined form of document carries, in a line alongside the line of the selectively provided serial code markings mentioned above, synchronisation code markings located one after another in the said feeding direction. The apparatus includes a second reading head for reading the synchronisation code markings in dependence upon which the said synchronisation pulses are generated.

As explained below, each line along which code markings are provided is called a channel.

Preferably, for simplicity, and as explained in more detail below, embodiments of the present invention operate on the basis of two or three channels per document, a channel bearing code markings the pattern of which designates document handling instructions, a synchronisation channel, and if required a stop/start channel.

BRIEF DESCRIPTION OF THE DRAWINGS

For a better understanding of the present invention reference will now be made, by way of example, to the accompanying drawings, in which.

DESCRIPTION OF THE PREFERRED EMBODIMENT

Figure 1:
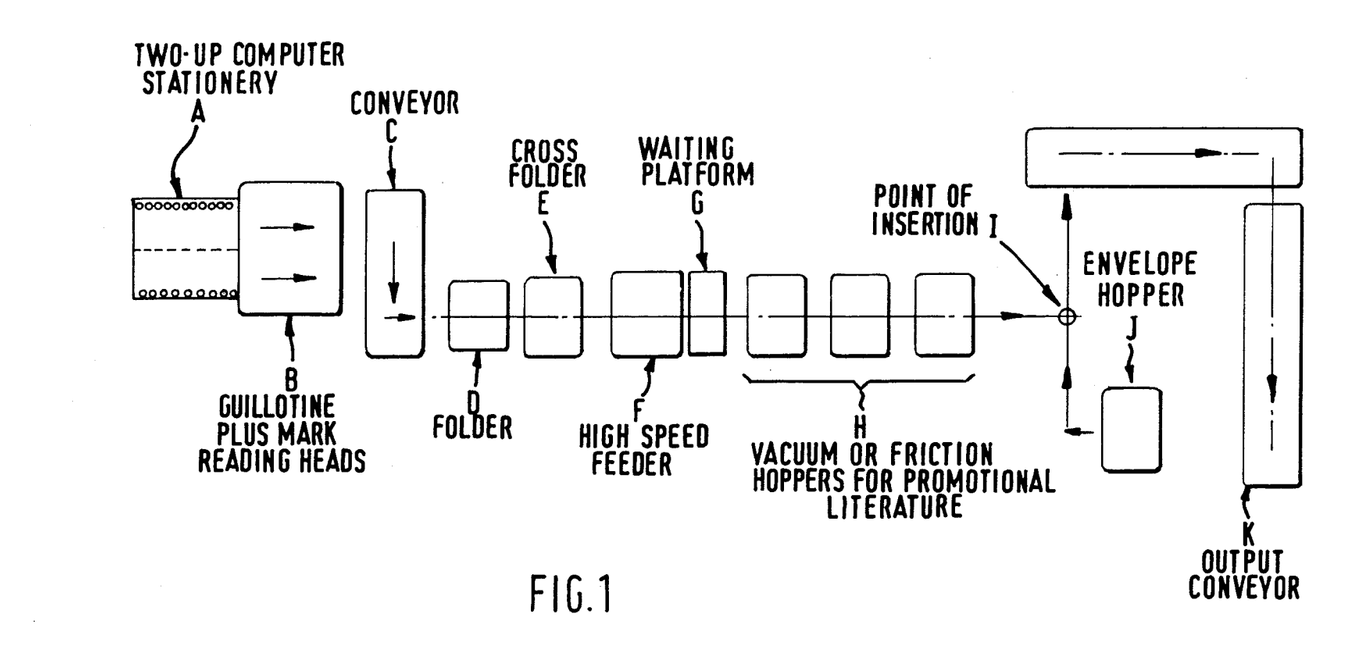
FIG. 1 is a block diagram illustrating schematically the overall configuration of one document inserting machine.

The machine illustrated in FIG. 1 is adapted to employ "two-up" fanfold computer stationery for providing master documents. The "two-up" computer stationery A has two separate documents (e.g., invoices or statements) printed across its width. The stationery is fed to a guillotine machine station B. At this stage code markings on the master documents are read to control subsequent machine operations. The guillotined master documents are carried by a conveyor C to a folder D and a cross-folder E which are operable to fold the documents as required. At high speed feeder station F additions (of supplementary documents) may be made to the master documents. The assembled master documents and additions pass across waiting platform G and then travel along a route through the machine past hoppers H from which promotional literature, for example, can be added to the master documents. The number of hoppers H can be varied.

Envelopes are fed from hopper J and meet the assembled bundles of documents at insertion point I. The envelopes with the inserted documents are then carried by conveyors to machine output K.

Figure 2:
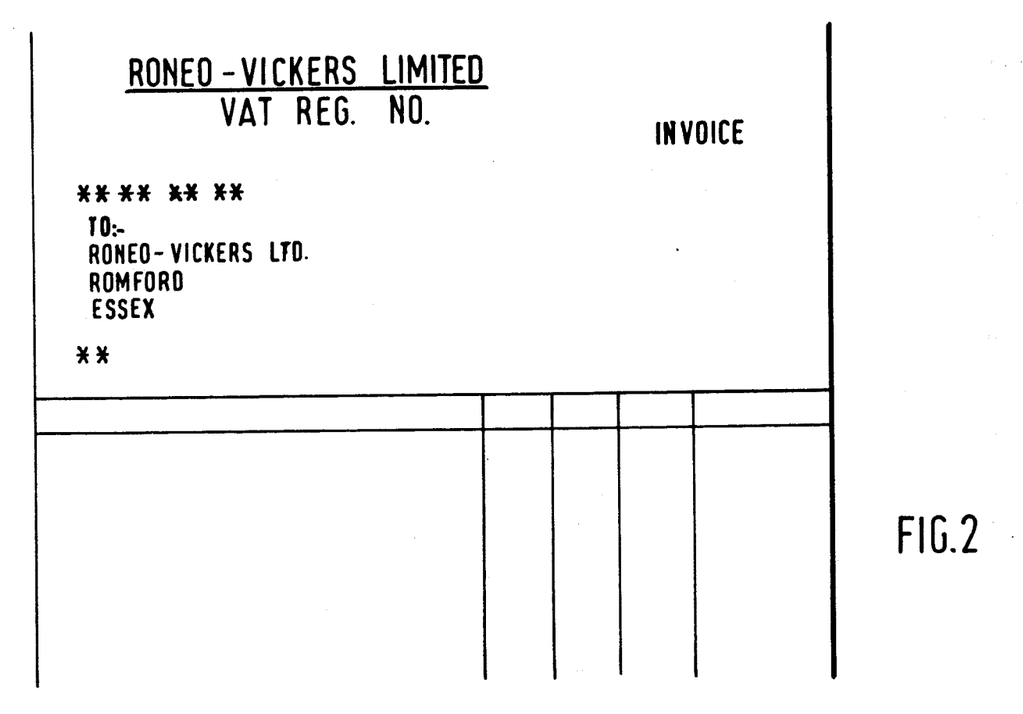
FIG. 2 shows an example of a master document as used in a previously proposed document inserting machine.

FIG. 2 illustrates in general form a master document, for use with a machine of the general configuration shown in FIG. 1, bearing coding marks as employed previously.

The document is computer printed, and there are printed thereon coding marks constituted by pairs of asterisks along horizontal print lines as shown. Respective reading heads are positioned for reading pairs of asterisks, and, in dependence upon the presence or absence of the asterisks at respective reading locations along a print line, control codes are generated for controlling subsequent operations of the machine in respect to that particular master document, for example, to select those of hoppers H from which an additional document should be added to the master document. It is necessary that control signals arrive at an appropriate hopper H, for example, as the master document reaches that hopper, to ensure that each master document is assembled together with the appropriate additional documents. This synchronisation has been carried out by means of shift registers.

It will be apparent from the document shown in FIG. 2 that in a previously proposed machine employing such documents each reading head for reading a pair of asterisks is used effectively for only a fraction of the total time available.

In a document inserting machine embodying the present invention a larger proportion of available reading time is employed. Thereby, the number of reading heads needed for reading, from successive master documents, coding marks the different possible patterns of which are sufficient for specifying a given number of different operations is reduced from the number of reading heads which would be required to permit reading and specification of those different operations in a document inserting machine employing a coding mark system as described with reference to FIG. 2.

A reduction in the number of reading heads can lead to consequent reduction in the complexity of the electronic circuitry employed and can improve reliability.

Document handling apparatus embodying the present invention is operable to read coding marks on a document in a serial fashion. Thus, rather than presenting coding marks on a document in a horizontal line transverse to a feeding direction as shown in FIG. 2, coding marks on a document for use with handling apparatus embodying the present invention are vertically aligned down the document in the direction of document feed and one reading head in the apparatus is provided for reading each vertical line of coding marks.

Figure 3:
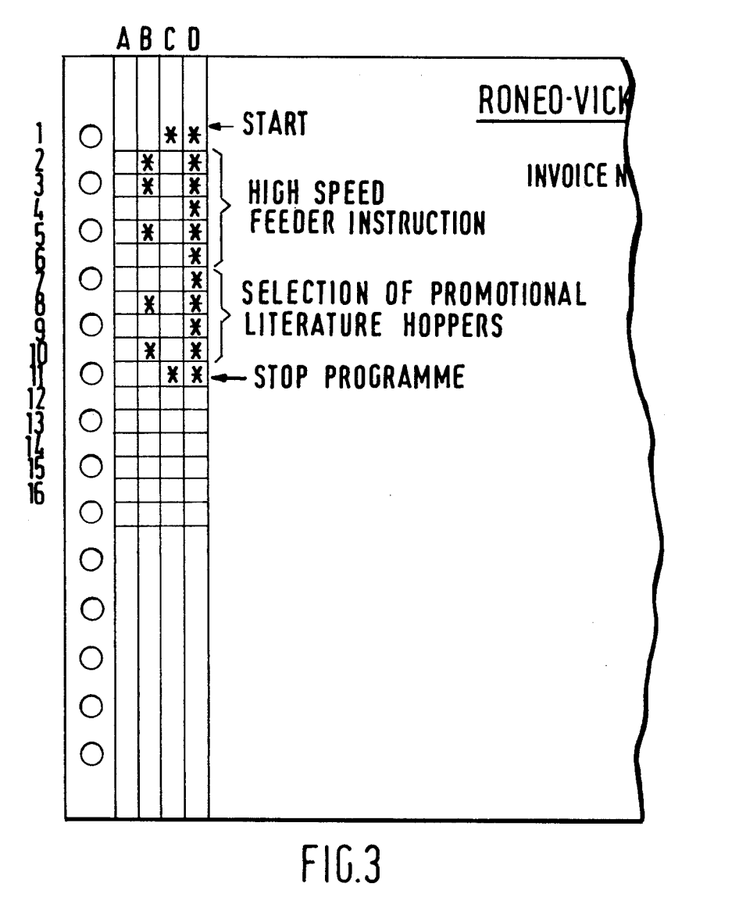
FIG. 3 shows an example of computer stationary for use in a document inserting machine embodying the present invention.

FIG. 3 illustrates a document bearing coded marks for use with a document inserting machine embodying the present invention.

The document shown in FIG. 3 is provided on computer stationery on which documentary information and coding marks have been printed by a computer printer.

The coding marks may, as illustrated, be placed in a sprocket-hole margin of fanfold computer stationery. This allows for subsequent trimming of the margin and hence removal of the coding marks. With a suitably modified printer, the coding marks could be placed in the sprocket hole margin between the edge of the paper and the sprocket holes. Of course, the coding marks may be placed in both sprocket hole margins of the paper.

In the illustrated document, four possible vertical lines of coding marks (four channels) are provided, of which three are actually employed in the example of FIG. 3. Of course, more than four channels may be provided, for example, where short master documents are used.

In the document handling apparatus respective reading heads are provided for the channels employed.

In FIG. 3, channel A is not used. Channel B is an instruction channel which has printed therein coding marks, which may be asterisks as shown, which specify operations of various machine stations in the document inserting machine with which the document is used. The document inserting machine may have the general configuration shown in FIG. 1. For example, the patterns, or present/absent combinations, of coding marks in channel B on horizontal print lines 2 to 6 in FIG. 3 specify operational instructions for a high speed printer station, whilst the patterns of coding marks in horizontal print lines 7 to 10 specify from which hoppers H additional documents are to be added to the master document concerned.

Channel C is a start/stop channel for indicating, for each master document, the points at which reading of coding marks in channel B is to be commenced and terminated in the particular example of FIG. 3.

Channel D is a synchronisation channel. In the illustrated example, the occurrences of horizontally adjacent marks in channels C and D indicate stop and start.

In a document handling apparatus embodying the present invention, for using master documents on which coding marks are presented in vertical lines, it is necessary to establish some form of synchronisation so that reference timings can be established for the reading of code markings, whereby, for example, in the case of a document inserting machine, line coding marks relating to a high speed feeder can be correctly identified and distinguished from those relating to hoppers H and the mark/space pattern of the line coding marks can be resolved.

When documents such as that illustrated in FIG. 3 are employed, synchronisation may be established by means of synchronisation pulses derived from drive sprockets for feeding the documents or from the sprocket holes in the documents, but synchronisation marks are preferred.

However, as an alternative, which can be used also for paper not provided with sprocket holes, a synchronisation column of coding marks can be provided as at D in FIG. 3. The successively read marks provided in channel D provide the necessary synchronisation pulses.

The provision of a synchronisation channel can provide for a system in which it is not necessary to print the coding marks for synchronisation control with fixed pitch (vertical mark spacing). If the reading head for reading coding marks in the instruction channel B is rendered operative to read a coding mark only when a coding mark is detected in the synchronisation channel D variable mark pitch may be used. For example, coding marks may then be printed only on lines across a document which carry printed characters anyway, so that no special lines have to be added for the coding marks and line skipping by the printer can be continued.

Of course coding marks must be printed on sufficient lines to accommodate all the control instructions for the document concerned even if this means that some code mark lines carry no printed characters. Fixed pitch synchronisation marks can, of course, be used if desired.

The number of coding marks, in the instruction channel B, for each of the various inserting machine sections (e.g., high speed feeder and additional document hopper sections) may be increased or decreased within the limits of document length and the type of machine being used.

The instructions read from the instruction channel relating to each master document are fed to shift registers appropriate to control the various machine sections and timing control is effected so that appropriate sections operate as required as the relevant master document arrives at the sections.

Figure 4:
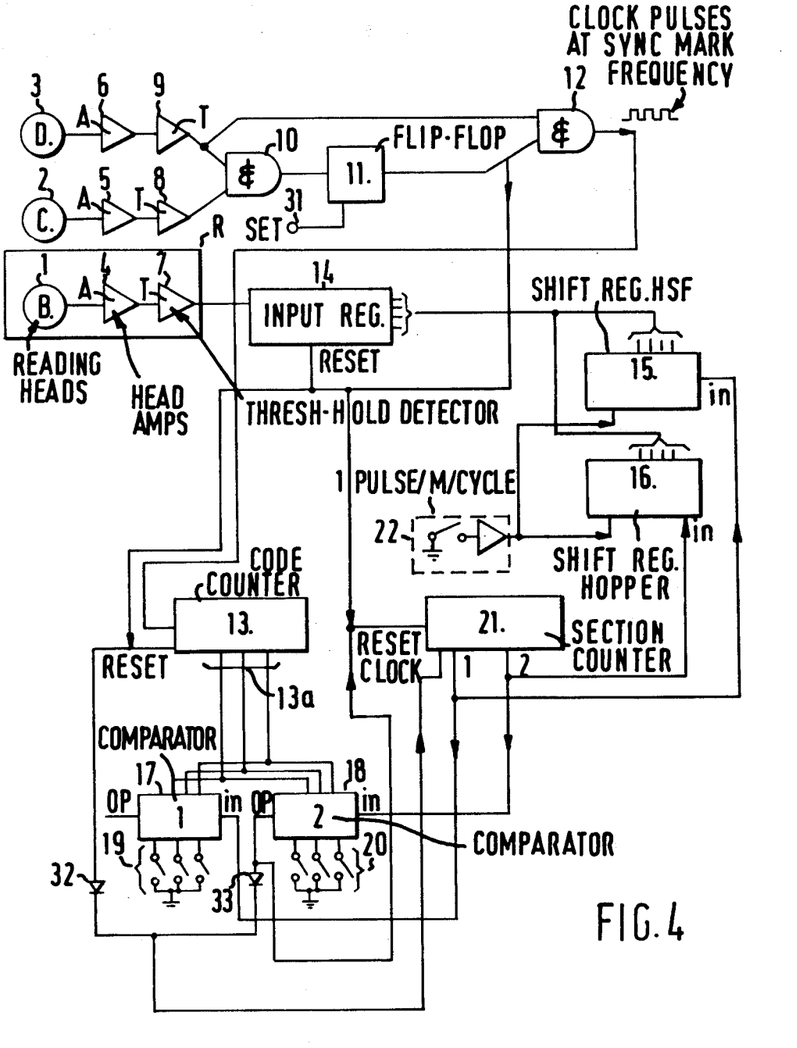
FIG. 4 is a block diagram schematically illustrating parts of control circuitry of a document inserting machine embodying the present invention.

In FIG. 4, reading heads 1, 2 and 3 are respectively for reading coding marks in channels B, C and D of a document as shown in FIG. 3. Amplifiers 4, 5 and 6 are provided for the heads 1, 2 and 3 respectively, to amplify their output signals. Threshold detectors 7, 8 and 9 are connected to receive amplified head output signals from amplifiers 4, 5 and 6 respectively.

Figure 5:
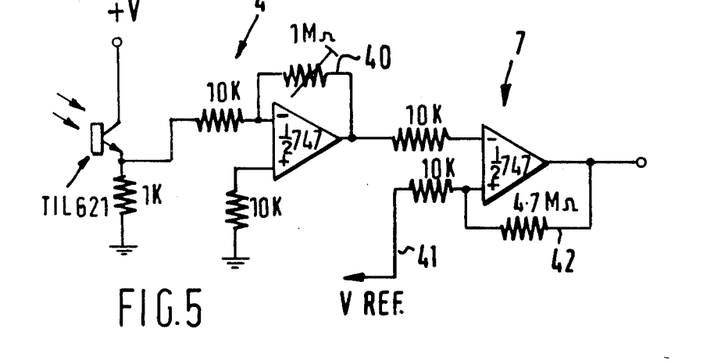
FIG. 5 shows a portion of FIG. 4 in greater detail.

The assembly in the rectangular R (FIG. 4) is shown in greater detail in FIG. 5. The reading head 1 includes a phototransistor (TIL 621 of Texas Instruments Ltd). The emitter of the phototransistor is connected through a resistor to earth and through a resistor to a negative input of the amplifier 4, the output of which is also connected to the negative input by a variable resistor 40 providing variable gain, the maximum gain being 100. The positive input of the amplifier 4 is connected through a resistor to earth. The output of the amplifier 4 is connected through a resistor to the negative input of a similar amplifier connected as a comparator to provide the threshold detector 7, the positive input being connected through a resistor to a voltage reference by connection 41. This threshold reference may, if required, be common to all the threshold detectors. A positive feedback resistor 42 provides the detector 7 with inherent hysteresis such that the switch-on point is slightly different from the switch-off point to prevent oscillation and hence spurious signals. The amplifiers each consist of half of a 747 unit and the values of the various resistors are marked in FIG. 5.

The output signal of a threshold detector is a "1" signal when the corresponding head detects a coding mark and a "0" signal otherwise.

The outputs of threshold detectors 8 and 9 are connected to respective inputs of an AND gate 10 which thus provides a "1" output signal from its output when coding marks are detected simultaneously in the start/stop and synchronisation channels C and D.

The output of AND gate 10 is connected to an input of a flip-flop 11, an output of which is connected to one input of an AND gate 12. The output of threshold detector 9 is connected to another input of AND gate 12. The flip-flop 11 is arranged so that the output signal delivered to AND gate 12 is "1" after a "start" coding mark is detected in channel C (simultaneously with a synchronisation mark in channel D) until a "stop" coding mark is detected.

Thus, during this time, between start and stop, the output of AND gate 12 delivers clock pulses of synchronisation coding mark frequency (which may, of course, be variable).

The output of the AND gate 12 is connected to a clock pulse input of a code counter 13.

The output of threshold detector 7 is connected to an input of an input register 14. The input register thus receives, in series, signals derived from coding marks in the information channel B.

The output of flip-flop 11 is connected to a reset input of the input register 14. Thus, the input register is reset by a reset signal from flip-flop 11 each time a new "start" mark is detected in channel C and is thereby cleared to receive signals derived from coding marks on a new master document. Signals serially received at the input register 14 are fed to respective shift registers 15 and 16 for controlling the operations of, for example, high speed feeder and additional document hopper sections of the document inserting machine respectively, the shift registers being rendered operative in succession by means described below.

The timing of delivery of the signals to the respective shift registers, and of feeding out of those signals from the shift registers to control circuitry of the respective sections so that appropriate operations are carried out as the appropriate master document reaches the machine stations controlled by those sections, is effected as follows.

Each time a new "start" mark is detected in channel C, code counter 13 is reset by means of the reset signal from flip-flop 11. Thereafter, the code counter 13 counts clock pulses from AND gate 12 and along output lines 13a the counter 13 delivers count value signals which are fed to each of two comparators 17 and 18 for comparison with count values set at the comparators by means generally indicated at 19 and 20 respectively.

Section counter 21 is reset by means of the reset signal from flip-flop 11 each time a new start signal is received. Also the reset signal is applied to a clock input of the section counter 21 so that the section counter is set to 1, and a "1" signal is delivered from an output 1 thereof to an input "in" of shift register 15 to open the register for signals from input register 14. The "1" signal from output 1 is also applied to an input terminal "in" of comparator 17 which is rendered operative thereby.

When the count value from counter 13 coincides with the value set at comparator 17 by means 19, a "1" is supplied from an output O.P. of comparator 17 and a clock signal is thus applied to the section counter 21.

That counter is clocked and a "1" signal is now delivered from an output 2 thereof to an input "in" of the shift register 16 to open the register for signals from input register 14 and to the input "in" of comparator 18, shift register 15 being closed and comparator 17 being rendered inoperative.

It will be appreciated that the count value set by means 19 corresponds to the number of synchronisation coding marks within the high speed printer instruction section; in FIG. 3, five coding marks. Thus, the shift register 15 receives signals derived only from those coding marks in the instruction channel B relating to the high speed feeder.

The "1" signal delivered from output 2 of section counter 21 is fed to an input terminal "in" of the comparator 18 which is rendered operative thereby. When the count value from counter 13 coincides with the value set at comparator 18, a "1" is supplied from an output O.P. of comparator 18, and a clock signal is thus applied to the section counter 21.

Thus, the register 16 receives signals derived only from those coding marks in the instruction channel B relating to the hoppers.

The signal from output O.P. of comparator 18 also resets the section counter 21, and thereby, upon detection of a "stop" mark in channel C (when the output of flip-flop 11 changes) the circuitry shown in FIG. 4 is ready to read coding marks on a new master document.

Pulse generator 22 generates one pulse in each machine cycle (i.e., each time a master document is fed in to the document inserting machine) to cause read-out of station control information from shift registers 15 and 16.

In FIG. 4, "SET" 31 to flip-flop 11 provides a switch-on reset pulse to ensure that the flip-flop 11 is initially placed in the correct condition prior to reading of any codes.

Diodes 32 and 33 in FIG. 4 are simply for isolation purposes.

Figure 6:
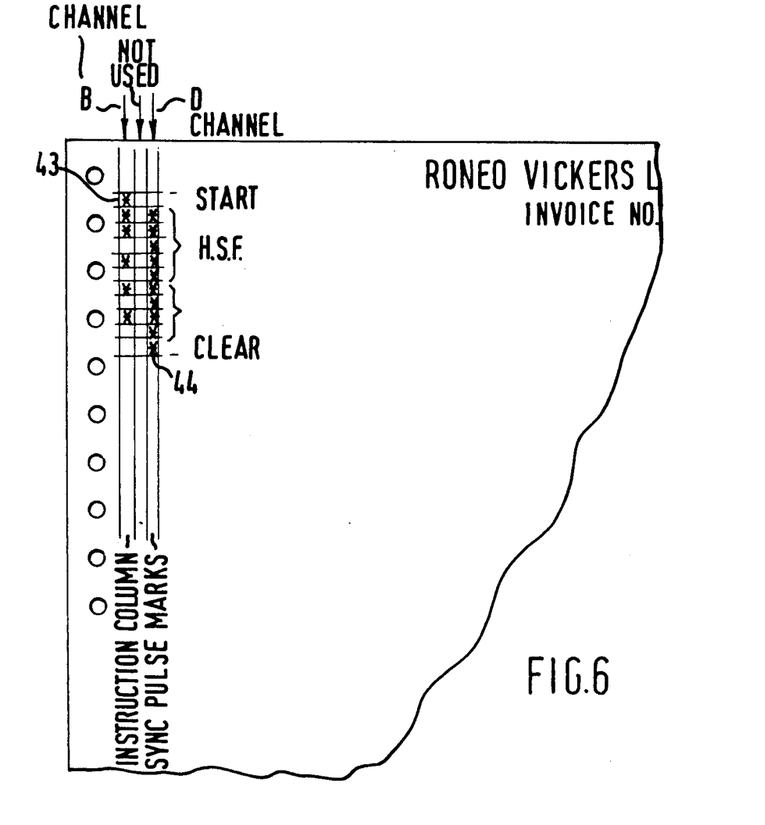
FIG. 6 shows another example of computer stationary for use in a document inserting machine embodying the present invention.

Referring now to the document shown in FIG. 6, it will be seen that this has only two operative channels, in this example in channels B and D. The coding marks are in channel B and the synchronisation marks in channel D. There is no start/stop channel. Instead the first mark 43 in channel B is unique in that it is not in horizontal alignment with any mark in channel D. This unique feature of the document provides a start signal. The synchronisation marks terminate with an extra mark 44 to provide a signal to clear when all the synchronisation marks including mark 44 have been summed. The apparatus is then ready to respond to the next document.

Figure 7:
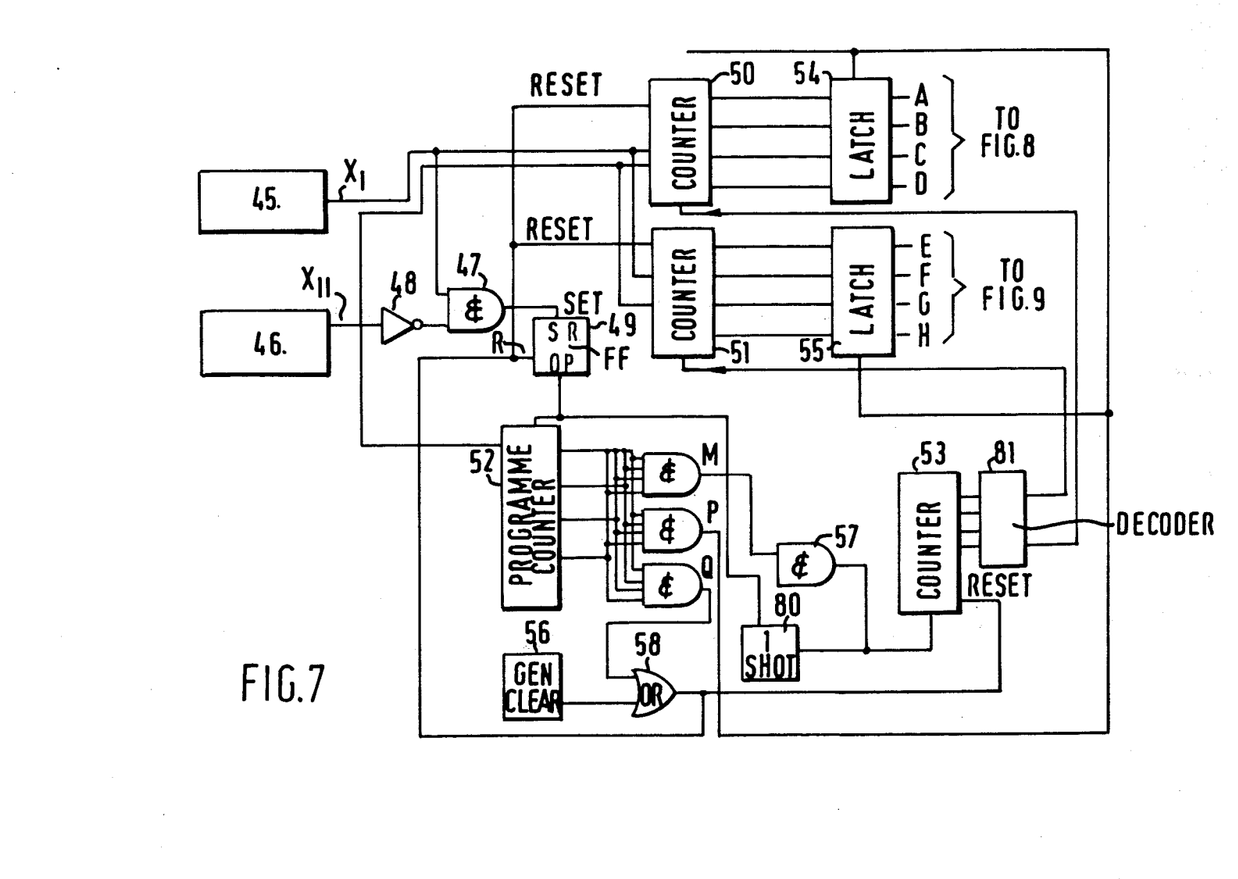
FIG. 7 shows a block diagram schematically illustrating a modification of the circuitry shown in FIG. 4.

Control circuitry for responding to documents as in FIG. 6 is shown in FIG. 7. Assemblies 45, 46 similar to FIG. 5 output a pulse ("1") for each mark and "0" for each absent mark along lines $X_1$ and $X_{11}$. Thus for the start signal, "1" is signalled to counters 50 and 51 from code channel B and "0" to counters 50 and 51 from code channel D. Simultaneously "1" is fed to AND gate 47 from $X_1$ and "1" is also fed to AND gate 47 through inverter 48 from $X_{11}$. A set-reset flip-flop 49 is thereby conditioned to enable a programme counter 52, and by way of a one-shot 80 to increment counter 53 which through a four-to-sixteen decoder 81 enables counter 50. It will be understood, that, prior to this, when the circuitry is first switched on a general clear pulse is delivered from a unit 56 through one input of an OR gate 58 to reset all the counters and registers in the apparatus as well as the flip-flop 49. The decoder 81 provides a potential for increasing the scope of the apparatus to perform additional functions.

Certain instructions are set in the programme counter 52 and as synchronisation pulses are signalled from channel D on the document and pass through line $X_{11}$ to the programme counter 52 these can be arranged selectively to open AND gates M, P, Q for the purpose of rendering the counters 50 and 51 effective in succession to charge shift registers described below with the coded information in document channel B. When the start signal as indicated above causes counter 53 to enable counter 50, the counter 50 registers information in accordance with the code marks pertaining to the high speed feeder, these marks representing a four-bit binary number. However, as soon as the programme counter 52 has received a number of synchronising pulses equal to a maximum preset therein an instruction passes to AND gate M and to AND gate 57, the other input of which is already set by flip-flop 49. This results in counter 53 disabling counter 50 and enabling counter 51 to register information in accordance with the code marks pertaining to the hoppers. These code marks represent single pulses respectively allocated to the hoppers. Whilst counter 50 is enabled the appropriate coded information is read in and held even during the operation of counter 51.

The penultimate synchronisation pulse opens AND gate P. This causes the information held at the output of the counters 50 and 51 and hence at the input of the latches 54 and 55 to be transferred to the outputs of the latches 54 and 55.

When the programme counter 52 has counted all the synchronisation pulses including that due to the mark 44, this sum being already preset in counter 52, AND gate Q is opened and delivers a pulse through the second input of the OR gate 58 to clear all the gates and registers but not the latches 54 and 55 which continue to hold the information derived from the code marks on the document. The apparatus is then ready to receive information from the next document.

Figure 8:
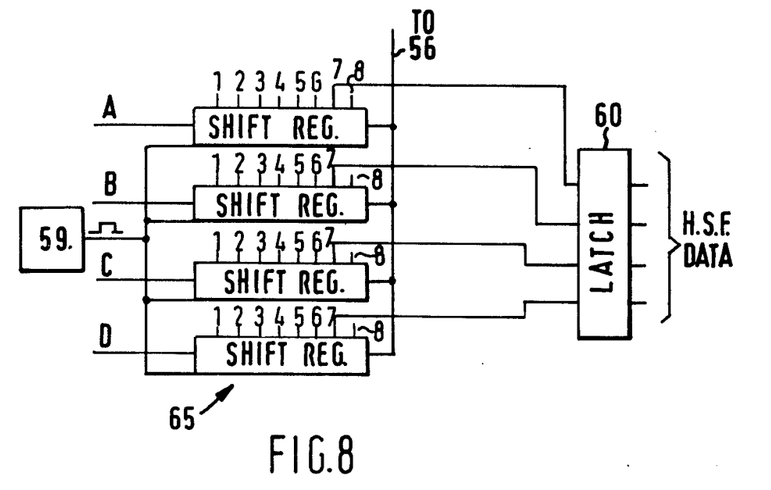
FIGS. 8 and 9 are block diagrams respectively showing two arrangements of shift registers.

Referring now to FIG. 8, it will be seen that the four bit binary coded number in latch 54 is transferred along lines A, B, C, D respectively to four shift registers 65. These are eight-bit shift registers, through each of which each coded entry is shifted through in steps under control of a unit 59 delivering to each shift register one pulse per machine cycle. In the example of FIG. 8, the output corresponding to the seventh bit in each register is connected to a latch 60. Therefore, the machine undergoes seven cycles before the encoded information is set in the latch 60. This is the delay required for the document to reach the high speed feeder for the document to have a number of supplementary documents added corresponding to the binary number registered in the latch 60. Other delays are, of course, possible by connecting the latch 60 to other locations in the register.

Figure 9:
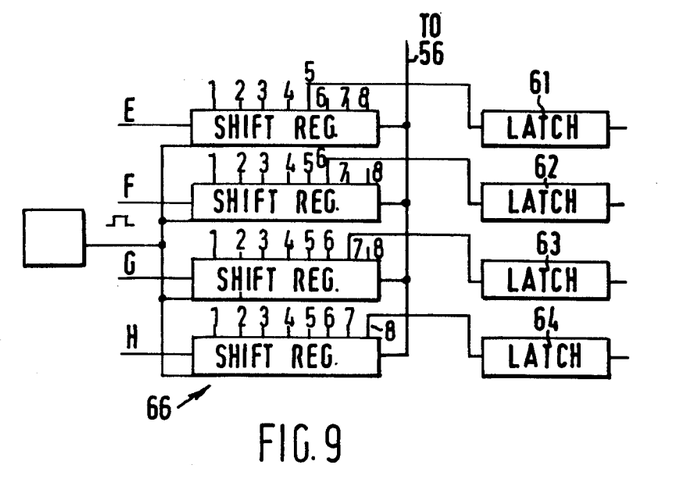

A similar arrangement of shift registers 66 is shown in FIG. 9, these being connected to the latch 55 (FIG. 7) along lines E, F, G, H respectively for four hoppers. As the document will pass these hoppers in sequence they are controlled through four respective latches 61, 62, 63, 64 are connected to output 5 for line E, output 6 for line F, output 7 for line G and output 8 for line H. Obviously the actual start position for each register depends on the machine configuration.

Suitable units for use in the circuits of FIGS. 7 to 9 will be readily apparent to those skilled in the art. However, the following references from the Motorola list will serve as a guide: No. MC 14518 for the counters 50, 51, 52, 53; No. MC 14508 for the latches 54, 55, 60, 61, 62, 63, 64; No. MC 14014 for each of the registers; No. MC 14012 for each of the AND gates; No. MC 14049 for the inverter; No. MC 14001 for the OR gate; No. MC 14514 for the 4–16 line decoder 81.

It will be appreciated that inverters in addition to inverter 58 may be required in the circuitry of FIG. 7 according to the precise logic system required.

In the case where a parity code is employed, an extra channel is provided on the document. In the case of odd-bit parity an extra code mark would be used in the extra channel where necessary to provide an odd number of code marks in each horizontal line containing two code marks. A similar system would of course be employed to provide even-bit parity.

Figure 10:
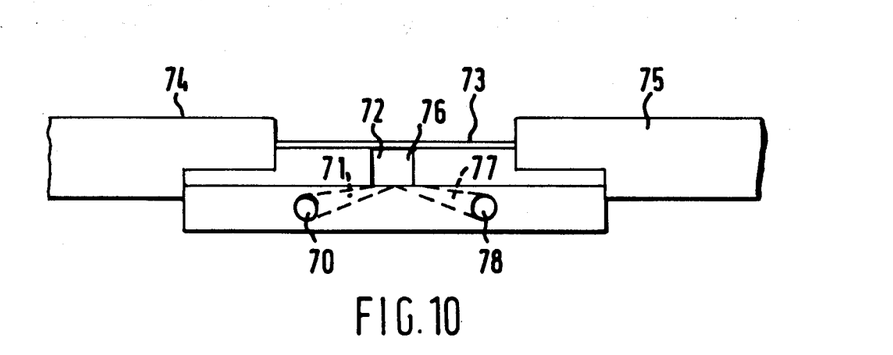
FIGS. 10 and 11 are respectively a side elevation and plan view of a reading head arrangement for detecting code marks on documents.
Figure 11:
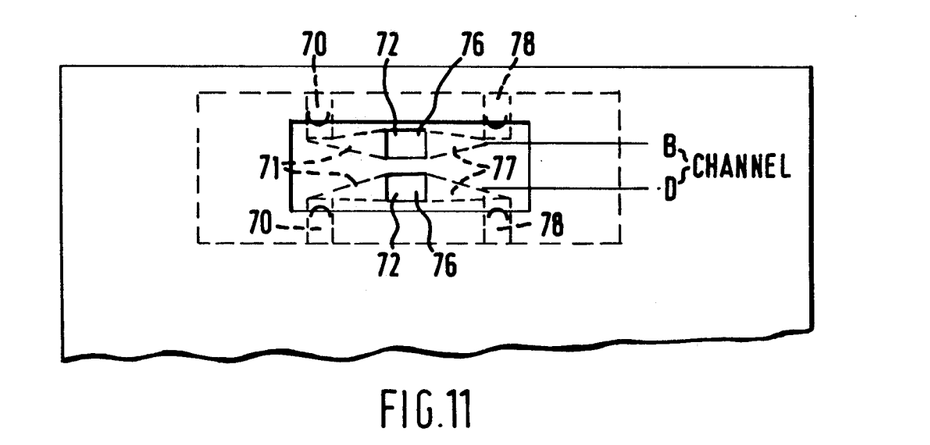

FIGS. 10 and 11 show a preferred reading head structure. Two reading heads are shown, for example, for channels B and D. In each reading head a light emitting diode or a filament lamp is mounted in a cavity 70. A non-coherent bundle of optical fibres is carried through passages 71 and 72 to the lower surface of a glass plate 73, 0.030 inches (0.0085 cm) thick. The light is reflected from the document as it travels over surfaces 74 and 75. The reflected light passages through a similar bundle of optical fibres in passages 76 and 77 to the phototransistor which is in a cavity 78.

It will, of course, be appreciated that coding marks other than asterisks may be used, and it is possible for an inserting machine employing only one channel of coding marks on master documents to be constructed.

The use of a document inserting machine embodying the present invention can offer cost savings which can be advantageously taken up by providing reading heads of increased sophistication, thereby providing for greater reliability in coding mark reading.

I claim:

1. Document handling apparatus including document feed means arranged to feed a predetermined document along a predetermined feeding direction through the apparatus, a document constituting said predetermined document bearing selectively provided serial code markings located one after another in said direction, a feeding head located to read said code markings in sequence while said feed means cause said document to traverse said feeding head, at least two document-handling stations distributed in succession beyond said reading head in said feeding direction, means at each said station having idle and operative conditions and when in said operative condition selectively subjecting said document to a predetermined handling operation at that station, synchronisation pulse generation means operable to generate synchronisation pulses for establishing reference timings for the reading of said code markings in dependence upon movement of said document in said feeding direction, and code responsive control circuitry connected between said reading head and said document handling stations and operable in response to the serial pattern of said code markings as read by said reading head at said reference timings for selecting one of said idle and operative conditions at each said station thereby selectively subjecting said document to a predetermined handling operation at that station.

2. Document handling apparatus according to claim 1, in which said serial pattern of code markings is constituted by the presence and absence of a predetermined form of visible printed mark on said document at successive reading locations which said reading head examines at successive reference timings in dependence on the movement of said document in said feeding direction.

3. Apparatus according to claim 1, in which said document also bears, in a line alongside said selectively provided serial code markings, synchronisation markings located one after another in said feeding direction, said synchronisation pulse generating means including a synchronisation reading head for reading said synchronisation markings, whereby said reference timings depend on said synchronisation markings.

4. Apparatus according to claim 3, in which said document also bears, in a line alongside said selectively provided serial code markings and said synchronisation markings, start/stop markings, the apparatus including a start/stop reading head for reading said start/stop markings and included in said control circuit for determining when the reading of said code markings is to be commenced and terminated.

5. Apparatus according to claim 1, in which said control circuitry includes shift registers allocated respectively to said document handling stations and operative to receive signals determined by said code markings and to synchronise handling operations determined by said signals with the arrival of said documents at each of said stations.

6. Apparatus according to claim 5, in which said control circuitry also comprises as many comparators as there are shift registers, and means for selectively opening said shift registers to receive said signals determined by said code markings, said comparators being operative to compare said synchronisation pulses with preset count values and in accordance with such comparison to generate clock pulses controlling said shift register opening means, the apparatus further including means for setting said count values.

7. Apparatus according to claim 1, in which said document also bears, in a line alongside said selectively provided serial code markings, synchronisation markings located one after another in said feeding direction, said synchronisation pulse generating means including a synchronisation reading head for reading said synchronisation markings, comparator means connected to receive signals emanating from said synchronisation reading head, means for presetting count values in said comparator means for comparison with said signals emanating from said synchronisation reading head, said control circuitry including shift registers allocated respectively to said document handling stations for synchronising in said stations handling operations determined by said code markings with the arrival of said document at each of said stations, means connected to said comparison means to receive signals from said comparison means determined by said comparison for selectively enabling said shift registers to receive signals determined by different groups of said code markings, said groups being allocated respectively to different groups of said shift registers, one group of code markings being binary coded for controlling handling operations is one said station and another group of said code markings being for individually controlling a handling operation in each of a group of further stations.

8. Apparatus according to claim 2, in which said reading head comprises a source of light, a group of optical fibres for conveying light from said source to a reading location to be traversed by said serial pattern of code markings upon movement of said document in the feeding direction, a further bundle of optical fibres for conveying light reflected from said document and having an intensity dependent on the presence of a marking traversing said reading location, and a phototransistor mounted to receive the light conveyed by said further bundle of fibres.

9. For use in apparatus according to claim 3, a document bearing selectively provided serial code markings located one after another in a predetermined direction along which the document is to be fed through the apparatus, said markings specifying operational instructions for the apparatus, and bearing also, in a line alongside said selectively provided serial code markings, synchronisation code markings located one after another in said direction, said synchronisation markings specifying a time relationship between said operational instructions and the operation of the apparatus.

* * * * *

UNITED STATES PATENT OFFICE
CERTIFICATE OF CORRECTION

PATENT NO. : 4,204,640
DATED : May 27, 1980
INVENTOR(S) : PAUL FULLER

It is certified that error appears in the above-identified patent and that said Letters Patent are hereby corrected as shown below:

The filing date in this application should read December 13, 1978

Signed and Sealed this

Twenty-sixth Day of August 1980

[SEAL]

Attest:

SIDNEY A. DIAMOND

Attesting Officer

Commissioner of Patents and Trademarks